United States Patent
Sterk

[11] 3,817,662
[45] June 18, 1974

[54] WAVE MOTOR
[76] Inventor: Stephen Sterk, 3822 Apalachee Pkwy., Tallahassee, Fla. 32301
[22] Filed: Jan. 3, 1973
[21] Appl. No.: 320,830

[52] U.S. Cl. .................................. 417/333, 60/22
[51] Int. Cl. ..................... F04b 17/00, F04b 35/00
[58] Field of Search ............... 417/330, 333; 60/22; 290/53

[56] References Cited
UNITED STATES PATENTS
1,403,702   1/1922   Melvin .................................. 60/22
1,482,713   2/1924   Stein .............................. 417/333 X FOREIGN PATENTS OR APPLICATIONS
525,349   9/1921   France .................................. 60/22

Primary Examiner—Carlton R. Croyle
Assistant Examiner—Richard Sher

[57] ABSTRACT

A wave motor having at least one vertically and slideably supported air tank to be positioned in the ocean for floating up and down due to waves passing thereby and operating an air compressor with the compressed air therefrom being used as a source of energy.

10 Claims, 5 Drawing Figures

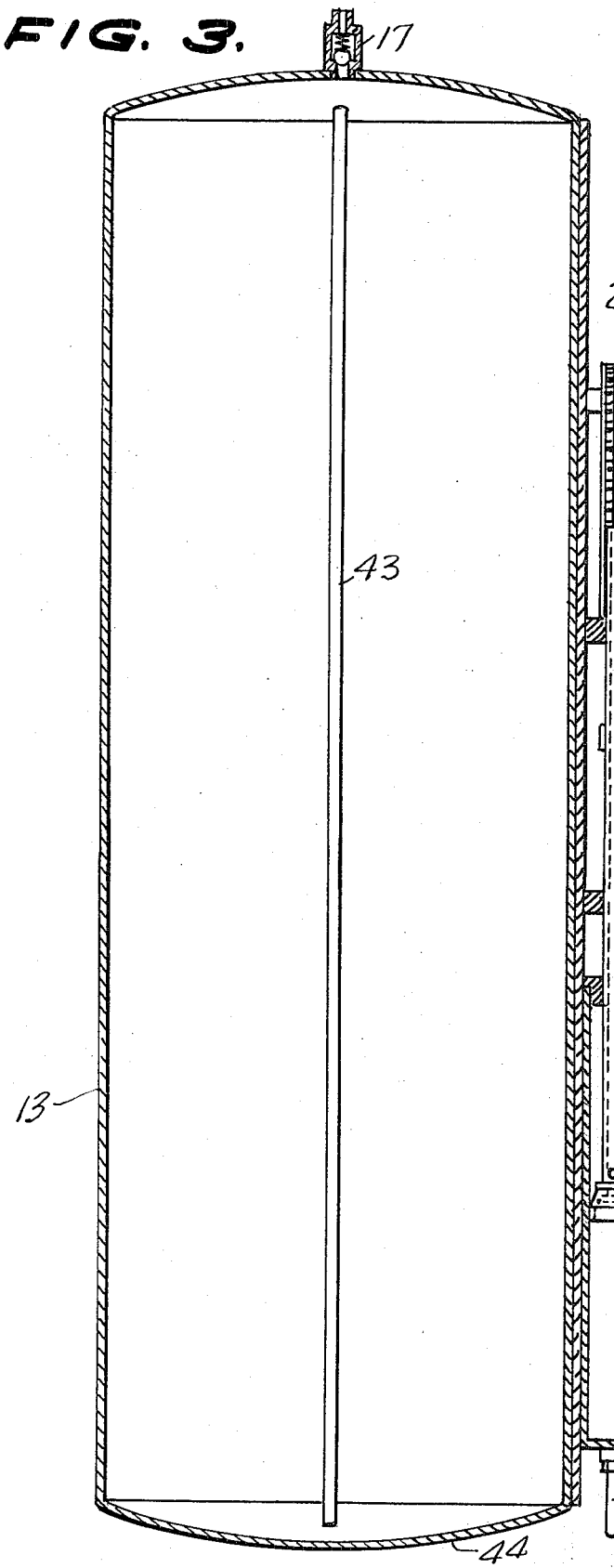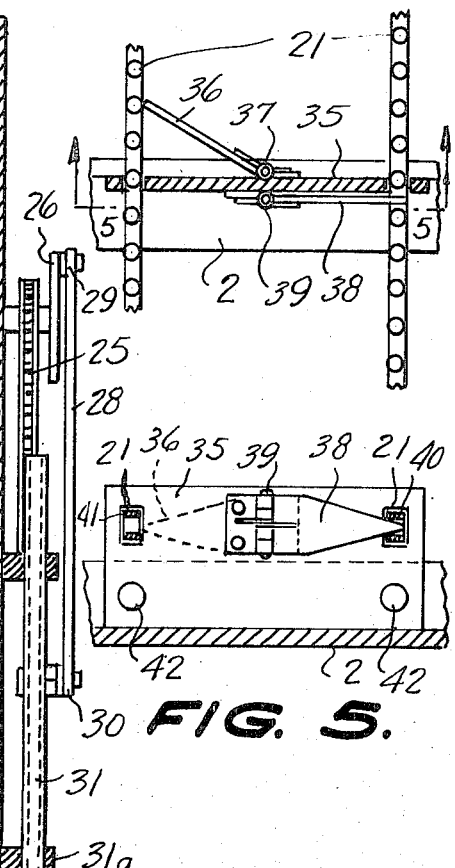

WAVE MOTOR

The present invention is concerned with a wave motor for obtaining energy from the random wave motion of the surface of an ocean.

The principal object of the present invention is to provide a device for utilizing the wave motion of a body of water to produce compressed air which in turn can be utilized for operating further devices.

A still further object of the invention is to provide a wave motor which can be of various sizes depending on the amount of compressed air desired and which wave motor will remain in a given location in the ocean so as to operate more efficiently.

Another important object is to provide a wave motor which can be used as a platform for a number of other useful purposes.

Figure 1:
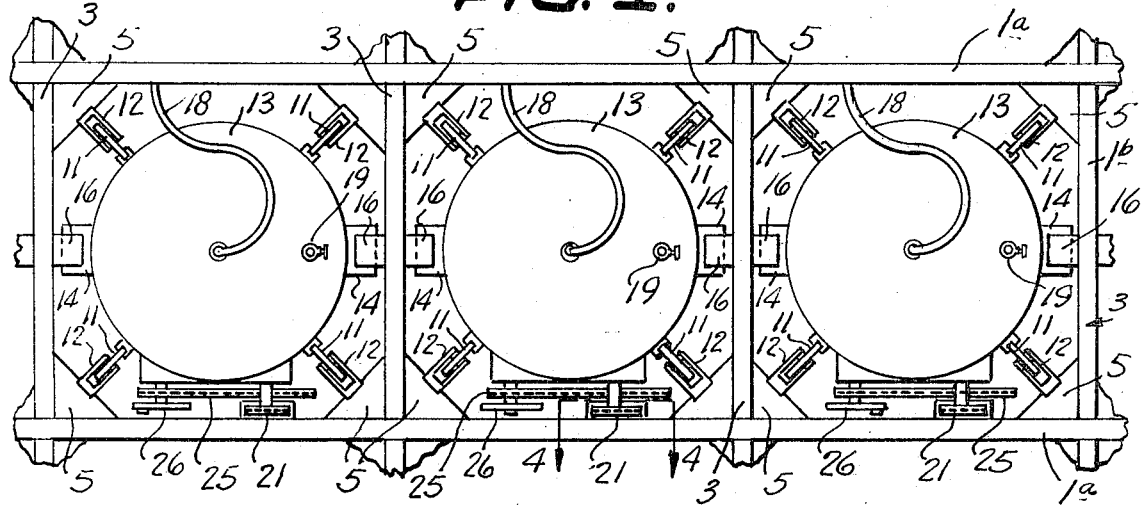
Figure 2:
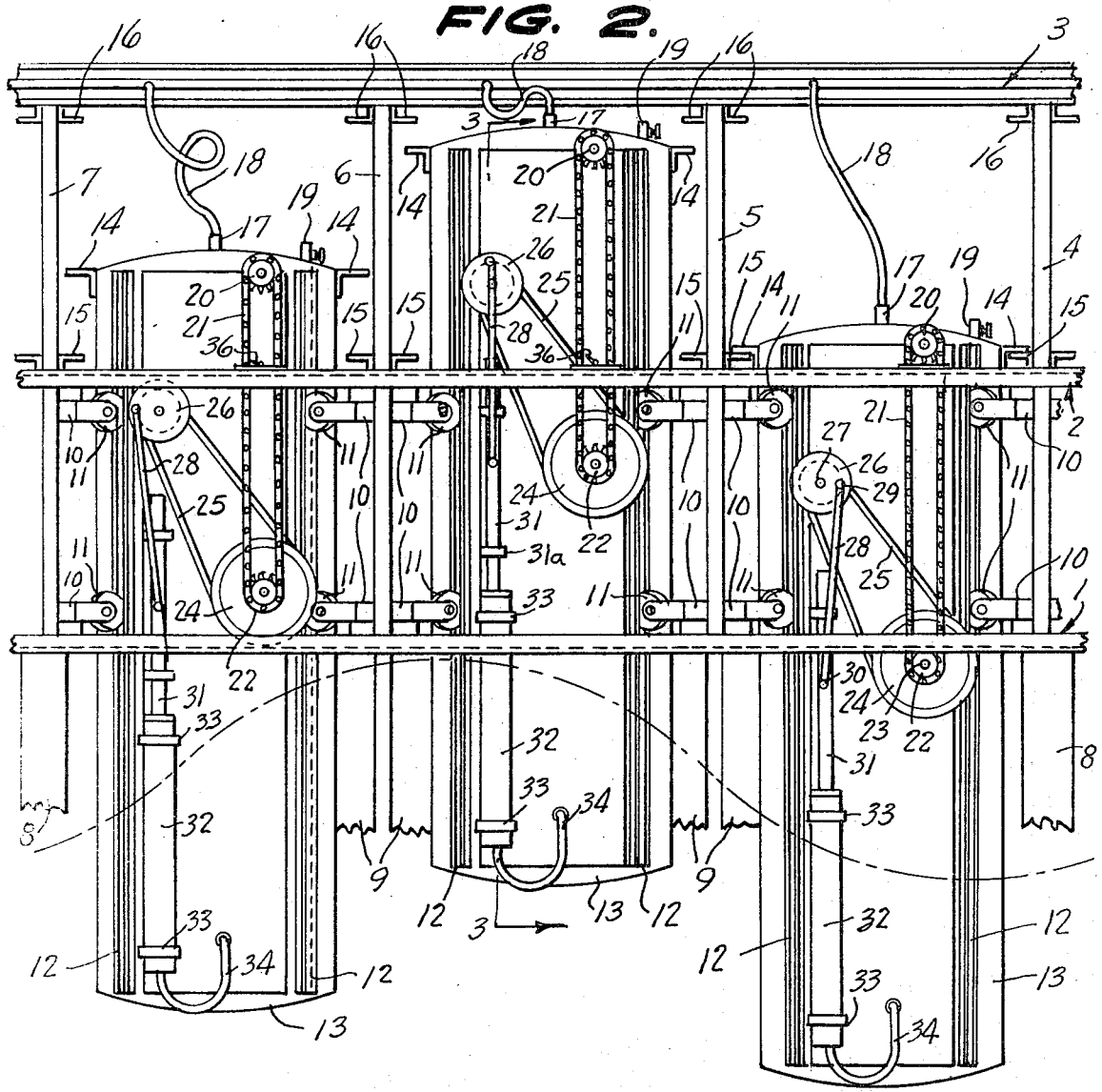

Further objects of the invention will be partly pointed out and partly obvious from the following description of the accompanying drawings, in which, FIG. 1 is a top partial view of a wave motor according to the present invention, FIG. 2 is a partial side elevation of said wave motor, FIG. 3 is a vertical section taken on line 3—3 of FIG. 2, FIG. 4 is an enlarged detail sectional view taken on line 4—4 of FIG. 1 of a ratchet mechanism, and, FIG. 5 is a view taken on line 5—5 of FIG. 4.

Referring now more particularly to the accompanying drawings in which like and corresponding parts are designated by the same reference numeral, 1 generally indicates a bottom open frame, 2 an intermediate open frame and 3 a top intermediate frame. Each of said frames consists of spaced apart L-beams 1a fixedly connected by spaced apart lateral L-beams 1b. Uprights 4, 5, 6 and 7 are fixedly connected to and support frames 1, 2 and 3 spaced apart above one another.

Frame 1 has pilling or pillars 8 attached thereto for being positioned in the floor of the sea to normally support said frame so that the waves indicated in dotted lines in FIG. 2, will pass beneath frame 1.

Frame 1 can also have large vanes 9 suspended therebeneath which extend normal to one another and frame 1 without employing pillings 8. Said vanes can be sized so as to allow people to walk inside thereof underwater in observation posts with glass windows in said vanes. Anchors (not shown) could also be attached to frame 1 if necessary and positioned on the ocean bottom.

Each upright 4, 5, 6 and 7 has a plurality of arms 10 attached thereto and extending radially inwardly. Wheels 11 are each rotatably mounted in one of said arms and ride in one of the tracks 12 attached to and extending lengthwise of cylindrical air tanks 13 which tanks can thus ride up and down perpendicular to frames 1 and 2.

To limit the downward movement of each tank, flanges 14 are attached to said tanks while stops 15 are attached to medial crosspieces 3 each at a position to be engaged by one of said flanges when a tank reaches the lowermost desired position. Similarly stops 16 are attached to upper cross-pieces 3 to be engaged by flanges 14 to limit the upward movement of said tanks.

Each tank 13 has the following elements: An outlet one way valve 17 attached to the top of the tank so as to only allow air to pass out of the tank and not into the same. A hose 18 connected to valve 17 and to an air motor (not shown) operatively connected to a generator for generating electricity or to other devices for other purposes as desired. An outlet valve 19 is also attached to the top of each tank.

A sprocket 20 rotatably mounted near the top of each tank, a chain 21 around said sprocket and a second sprocket fixedly mounted on a stub shaft 23 rotatably mounted on the tank and a pulley 24 fixedly mounted on said shaft. A belt extends around pulley 24 and also around a second pulley 26 rotatably mounted on a stub shaft 27 affixed to the tank.

A link 28 is pivotally connected to axle 29 on pulley 26 and also to axle 30 on piston rod 31. A cylinder 32 is retained by clamps 33 to the cylinder and has a piston rod 31 slideably extending in one end, while hose 13 is connected to said cylinder for receiving compressed air therefrom and to tank 34 for supplying said air therein. Guides 31a are attached to the tank 13 have said piston rod 31 slideable therein.

There is provided a ratchet device for each of said chains 21 and as an example of one such ratchet device, see FIGS. 4 and 5 in particular. Plates 35 are attached to cross-pieces 2 and each extend across and between the runs of one of said chains 21. A pointed member 36 is pivotally connected at one end by hinge 37 to the top of its plate 35 while the pointed end of member 36 can engaged and extend between a link of chain 21 when the chain is moving downwardly with its tank causing said chain to rotate sprockets 22. When a tank moves upwardly carrying its chain 21 therewith member 36 is disengaged from said chain but the pointed end of member 38 engages and extends between a link of chain 21 causing the further rotation of sprocket 22 in the same direction. Member 38 is hinged at 39 to the bottom of its plate 35 with holes 40 and 41 in plate 35 for the passage of the runs of chain 21. Rivets 42 attach said plates to their respective cross-pieces 2.

As shown in FIG. 3, a pipe 43 extends in each tank 13 to near the bottom 44 thereof while the other end of said pipe is connected to the respective outlet valve 19 whereby opening of said valve will cause compressed air in the tank to force water in the tank caused by condensation, out valve 19.

Each piston rod 31 has a piston 43a slideably positioned in its cylinder 32 for compressing air therein which has entered through port 44a.

The present wave motor can consist of one of said tanks 13 and its attached elements or as many as is desired. Thus more tanks 13 and attached elements can be employed than the three shown in the drawings to multiply the power production many times and in such cases hoses 18 can all be connected to a single large air motor for driving the same.

Where large installations of many tanks 13 are used, the apparatus can form a floating island which can be used for instance as an airfield, an oil drilling station, a tourist resort, an installation for the desalinization of sea water, a marine laboratry or other such installations mounted on frame 3. When used aa resort island, a section of frame 3 can be left out of the center of the island to form a swimming pool with a mesh screening suspended from said frame for protection from sharks.

In the use of the present device, piling 8 is inserted in the sea bottom or if vanes 9 only are used, then the device is anchored in place, with tanks 1 floating upright in the surface portion of the sea. As waves pass said tanks they will move the tanks up and down relative to the platform provided by frames 1–7. Ratches 35–39 will move chains 21 rotating pulleys 24 and 26 causing links 28 to reciprocate piston rods 31 and pistons 43a pumping air from cylinders 32 through hoses 34 to their respective tank 13 and also pass through valves 17 and hoses 18 to the air motor or other device connected to said hoses.

The tanks 13 and cylinders 32 are cooled by being submerged in the surrounding ocean waters.

The terms "ocean" or "sea" as used herein refers to any body of water normally having waves on the surface thereof.

The energy gained by this invention is pollution free, and the source is inexhaustible.

A supplementary free source of energy is available, by use of solar water heaters installed on the roof. The solar heated water can be stored in tanks and very easily raised to steam temperature, to drive steam turbines, using part of the electricity developed by the wave motor. This combination of solar heat with my wave motor invention would produce not only a more powerful energy source, but also a more continuous source. There will be days of low wave action and cloudy days. The combination above described is more applicable in southern waters.

I claim:

1. A wave motor comprising a supporting frame, at least one tank being slideably mounted in said frame for vertical movement on a body of water, an endless chain rotatably mounted on said tank, ratchet means mounted on said frame for engaging said chain and moving same upon relative movement between said tank and said frame, means operatively connected to said chain, capable of compressing air and connected to said tank for supplying compressed air therein and said tank having an air outlet.

2. A wave motor as claimed in claim 1 wherein said means operatively connected to said chain comprises a pulley operatively connected to said chain, a second pulley rotatably mounted on said tank, a belt extending around said pulleys, a link pivotally connected to said second pulley, and means for compressing air mounted on said tank and operatively connected to said link.

3. A wave motor as claimed in claim 1 including wheels rotatably mounted on said frame on opposite sides of said tank, said tank being cylindrical and positioned between said wheels and tracks on said tank having said wheels riding therein.

4. A wave motor as claimed in claim 1 including at least one pair of stops on said frame and at least one flange on said tank positioned for movement between said stops for limiting the movement of said tank relative to said frame.

5. A wave motor as claimed in claim 1 including piling connected to said frame and capable of supporting the same.

6. A wave motor as claimed in claim 1 including vanes connected to and suspended beneath said frame whereby said vanes can engage the water beneath said frame and thereby resist sidewise movement of said frame.

7. A wave motor as claimed in claim 1 wherein said tank air outlet has a one-way valve therein permitting only the air in said tank to move outwardly and a hose is connected to said air outlet.

8. A wave motor as claimed in claim 1 wherein a pipe extends longitudinally of the interior of said tank and a valve connected to one end of said pipe is mounted on the exterior of said tank.

9. A wave motor as claimed in claim 1 wherein said ratchet means consists of a plate connected to said frame and having holes with runs of said chain passing therethrough and a pair of pointed members are each hingedly connected to said plate on opposite sides thereof and extend in opposite directions each toward one run of said chain and capable of extending into a chain link on movement of said tank in one direction.

10. A wave motor as claimed in claim 1 including a plurality of said tanks slideably mounted on said frame, a plurality of said endless chains each rotatably mounted on a tank, a plurality of ratchet means on said frame each positioned for engaging one of said chains, a plurality of said air compressing means each mounted on one of said tanks and operatively connected to one of said chains and each of said tanks having an air outlet.

* * * * *